July 23, 1957 E. H. LANHAM 2,800,646

SIGNALING SYSTEMS

Filed Nov. 25, 1955 2 Sheets-Sheet 1

Inventor
EDWARD H. LANHAM
By Robert B. Hanson
Attorney

Inventor
EDWARD H. LANHAM
By Robert B. Harmon
Attorney

United States Patent Office 2,800,646

Patented July 23, 1957

2,800,646

SIGNALING SYSTEMS

Edward H. Lanham, Montreal, Quebec, Canada, assignor to Northern Electric Company, Limited, Montreal, Quebec, Canada, a corporation of Canada Application November 25, 1955, Serial No. 549,069

5 Claims. (Cl. 340—213)

This invention relates to communication systems and more particularly to communication systems for transmitting messages from a central station to an outlying district station of a plurality of such stations.

One of the methods employed for transmitting alarms or other vital instructions over a comunication system consists in receiving reports at a centrally disposed central station and transmitting messages to a selected outlying district station. In such systems, it is of prime importance that the service between stations have a high reliability characteristic together with other desired features such as simplicity in construction and economical maintenance.

It is an object of this invention to provide a two-way communication system between a central station and a selected district station, which is simple in construction, economical in maintenance and reliable in operation.

Another object of this invention is to provide a two-way communication system having the foregoing characteristics having means to originate a supervisory signal at the central station and means to acknowledge such a signal from the selected district station.

It is also an object of this invention to provide a two-way communication system with the foregoing characteristics having means for automatically indicating at the central station the nature of abnormal conditions existing in the line circuit between central station and the selected district station while the system is in the idle position.

Another object of this invention is to provide a two-way communication system with the foregoing characteristics, employing a plurality of electrically connected switching means having circuit connections arranged whereby a maximum number of predetermined functions are performed for a minimum number of such switching means.

These and other objects of this invention are obtained by providing a two-way communication system consisting of a central station and one or more outlying district stations individually connected to the central station by a pair of line conductors to form a closed line circuit, which is energized by a unidirectional energy source the current therefrom flowing in a predetermined direction, which has included therein a group of switching devices, responsive to the flow and the magnitude of the current, having circuit connections whereby selected devices from such group are combined interchangeably to perform predetermined functions.

A better understanding of the invention will be obtained by referring to the following description, taken in conjunction with the accompanying drawings, in which.

Figure 1A:
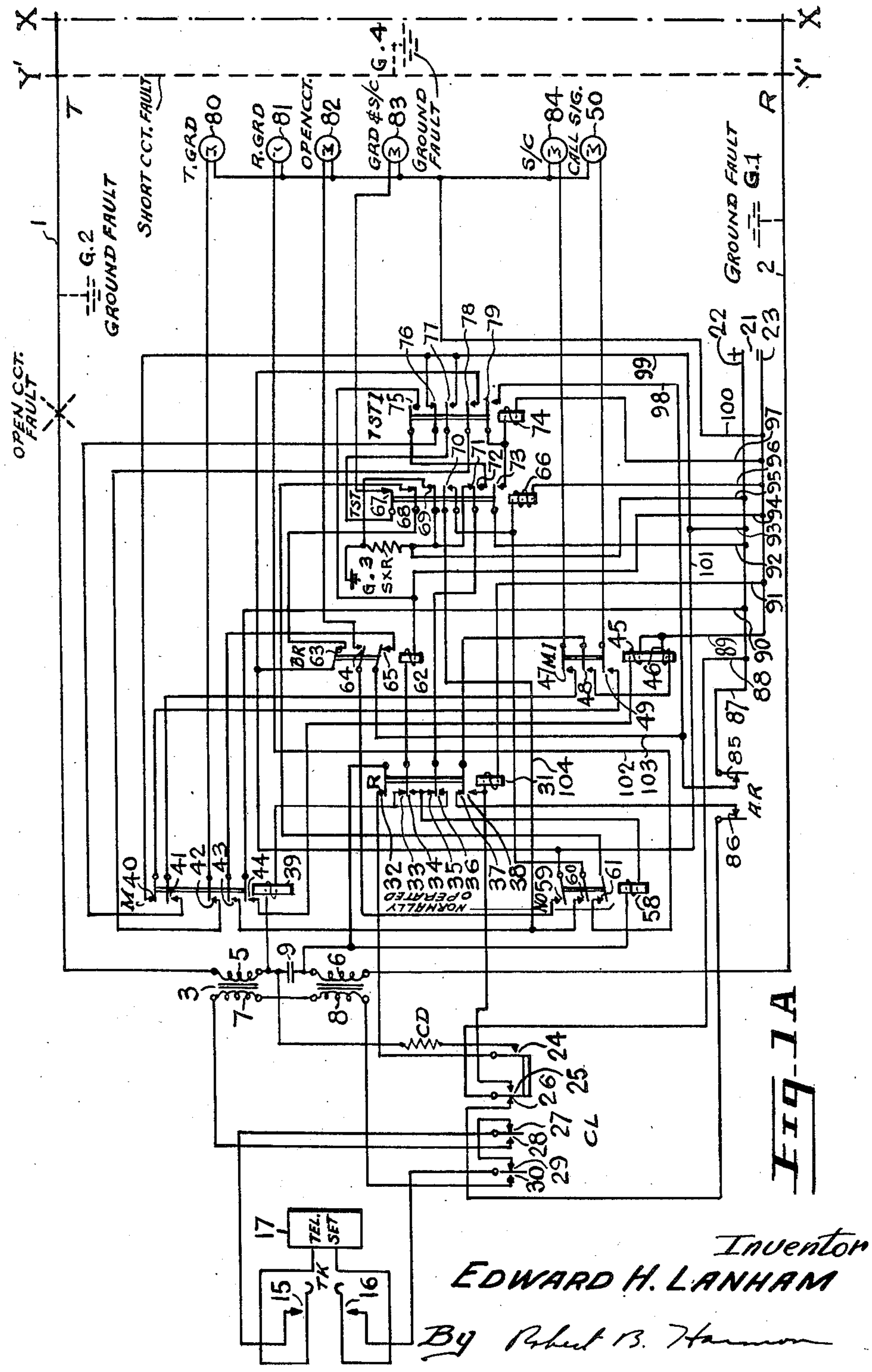
Fig. 1A and Fig. 1B illustrate the schematic circuit diagram of the two-way communication system in the idle condition in which a central station and a selected outlying district station of a plurality of such stations are shown, in which the invention is incorporated.
Figures 1B, 2:
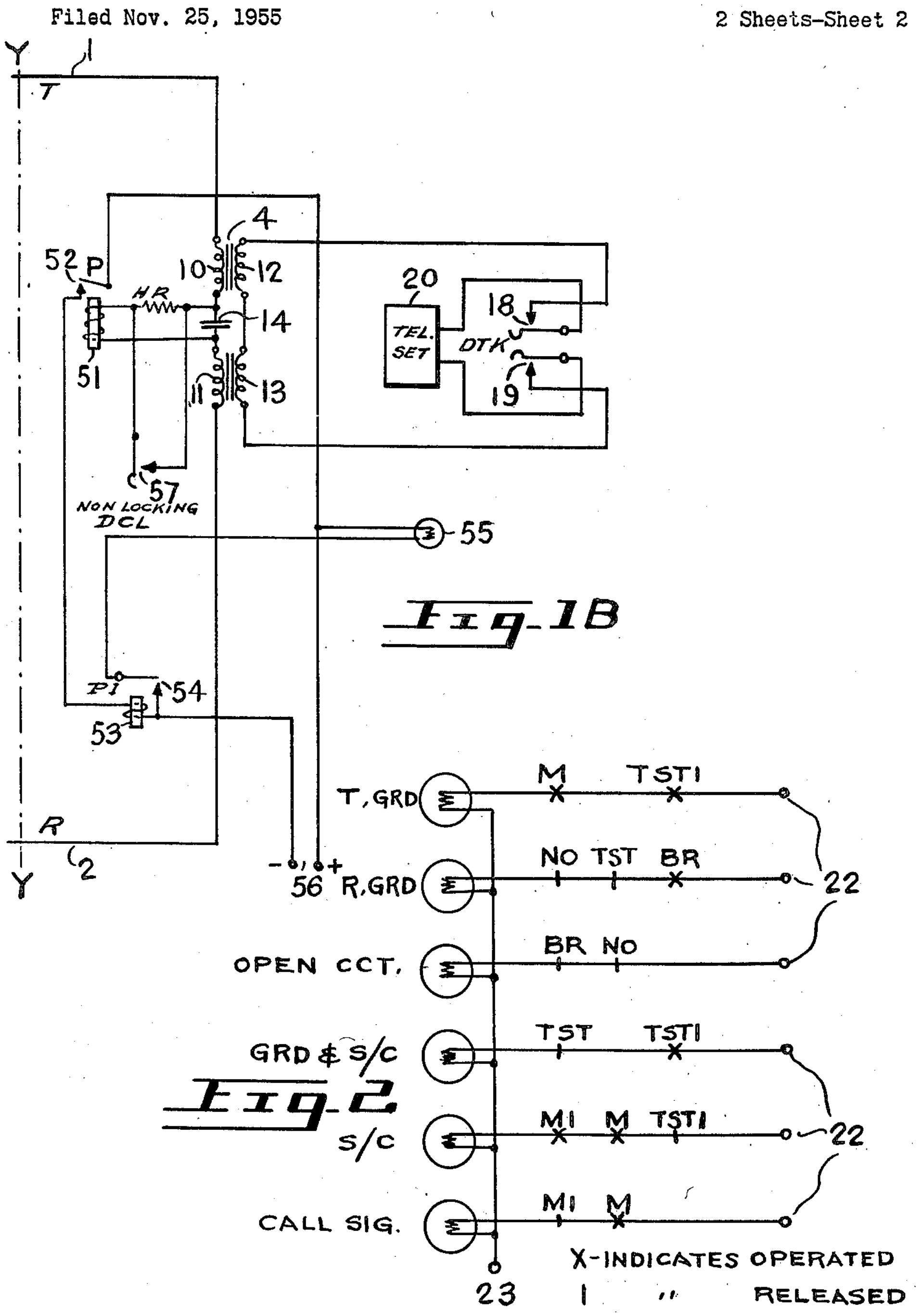
Fig. 2 illustrates the condition of the specific relays at the central station when jointly arranged to perform predetermined functions with respect to the actuation of signals to indicate faults in the line circuit or to indicate a call from a district station.

Referring to the drawings, there is provided a circuit consisting of the tip and ring line conductors 1 and 2 connected to the repeating coils 3 and 4, disposed at the central and district stations respectively, coil 3 consisting of the windings 5, 6, 7, 8 having capacitor 9 interconnected between windings 5, 6, and coil 4 consisting of windings 10, 11, 12, 13 having capacitor 14 interconnected between windings 10, 11, windings 7 and 8 being connected, through calling and answering key CL when operated, to telephone switching key TK, having contacts 15, 16 associated with telephone 17, windings 12, 13 at the district station being connected to the telephone switching key DTK having contacts 18, 19 associated with telephone 20.

Associated with the circuit, as described hereinabove, there is provided at the central station an unidirectional energy source 21, connected into the line circuit so that the current flow in the line circuit is in a predetermined direction and having terminals 22, 23 the positive terminal 22 being grounded at G3, calling and answering key CL having contacts 24, 25, 26, 27, 28, 29, 30, current reversing relay R having control coil 31 and contacts 32, 33, 34, 35, 36, 37, 38, resistor CD, marginal relay M having control coil 39 and contacts 40, 41, 42, 43, 44, dual wound relay M1 dependent thereupon and having control coils 45, 46 and contacts 47, 48, 49, visible call signal 50. At the district station, there is provided directional relay P having control coil 51 and contacts 52, relay P1 dependent thereupon and having control coil 53 and contacts 54, current limiting resistor HR, visible signal 55, energy source 56, non-locking call and answering key DCL having contacts 57.

There is provided also at the central station normally operated relay NO having control coil 58 and equipped with contacts 59, 60, 61, normally operated relay BR having control coil 62 and equipped with contacts 63, 64, 65, the current source 21 being disposed between the BR and NO relays, test relay TST having control coil 66 and contacts 67, 68, 69, 70, 71, 72, 73, relay TST1 dependent thereupon and having control coil 74 and contacts 75, 76, 77, 78, 79, resistor SXR, visible indicators 80, 81, 82, 83, 84, alarm release key AR having contacts 85, 86, conductors 87, 88, 89, 90, 91, 92, 93, 94, 95, 96, 97, 98, 99, 100, 101, 102, 103, 104 connecting the apparatus.

The operation of the system is as follows:

In the idle condition of the system, under normal conditions, a closed direct current energized line circuit is formed between the central and the selected district station through: 22—95—71—35—58—6—2—11—51—HR—10—1—5—39—33—62—94—23. The positive terminal 22 of energy source 21 is also grounded at G3, through: 22—95—69—G3.

Under the idle condition of the system, at the central station relays BR and NO are operated, relays M and M1 not being operated due to the marginal characteristics of relay M and the inclusion of the high resistance resistor HR at the outlying district station, relays TST and TST1 are not operated due to the combination of relay M in the released position and relays NO and BR in the operated position, and, at the outlying district station, relay P is not operated due to its directional characteristic.

When the attendant at the central station desires to signal the district station, the CL key at the central station is actuated and then released, the actuation of which completes a circuit to operate the current reversing relay R, through: 22—88—25—31—91—23.

The operation of the CL key also short circuits momentarily the condenser 9 from the line circuit through resistor CD the effect of which is to reduce the possibility of noise in the line circuit, through: 24—CD—9—32—24.

The operation of relay R reverses the flow of the current in the line circuit with respect to the flow of the current therein when the system is in the idle position, through: 22—95—71—36—39—5—1—10—HR—51—11—2—6—58—34—62—94—23. Relays BR and NO remain operated, relays M, M1, TST and TST1 are still released, while relay P, which operates, closes a circuit for the P1 relay, through: 56—52—53—56. The operation of relay P1 closes a circuit from energy source 56 and contact 54 of relay P1 so that the signal 55 becomes energized.

In response to the signal from the central station, the attendant at the district station actuates his key DCL which short circuits the current limiting resistor HR from the line circuit thus permitting the marginal relay M at the central station to operate due to the increased current in the line circuit. The operation of relay M completes a circuit for relay M1, through: 22—90—44—45—89—23.

Relay M1 locks up through its own contact 48, key CL having been released, through: 22—88—26—86—37—48—46—89—23. Upon the release of the DCL key at the district station, relay M releases but relay M1 remains operated due to its locking circuit.

The release of relay M by the release of the DCL key and the locking of relay M1 in its operated position allow a circuit to be completed for energizing visible signal 50, through: 22—93—99—40—49—50—100—23.

The attendant at the central and district stations may now converse with each other by actuating keys TK, CL and DTK which allows telephones 17 and 20 to be connected to the line circuit through contacts 15, 16, 28, 30 and 18, 19.

It may be necessary for the district station to signal the central station when the system is in the idle condition, in which event key DCL at the district station is actuated. The actuation of key DCL short circuits current limiting resistor HR out of the line circuit thus causing relays M and M1 to operate, relay M1 locking in its operated position. Relay M1 will remain in the locked position until released by the operation of the AR key, which breaks the circuit at its contact 86.

With the system in the idle state, under normal conditions, as indicated hereinabove, relays NO and BR are in the operated condition, relays M, M1, TST and TST1 and in their non-operated condition. Relays R, P and P1 remain unoperated with respect to the following alarm functions and perform no part therein.

Should the ring line conductor 2 become grounded, as at G1, then a closed line circuit is completed for relay M, through: G3—69—95—22—23—94—62—33—39—5—1—10—HR—51—11—2—G1—G3. Relay M, being marginal and current limiting resistor HR being still included in this circuit, remains unoperated, relay BR remains operated since it is still in the line circuit, but relay NO, which is normally operated when the system is in the idle state, releases due to the fact that its circuit is diverted around the circuit for the M relay, through: G3—69—71—35—58—6—2—G1—G3.

Relay TST does not operate since its energizing circuit, which includes relay NO in its unoperated condition and relays M and BR in their operated condition, is not completed. The joint action of relay NO releasing and relay BR remaining operated permits signal 81 to energize, indicating that the ring line conductor 2 is grounded, through: 22—93—101—63—68—61—102—81—100—23.

Should the line circuit become open, as at X, relays M, M1, TST, TST1 will remain non-operated but relays BR and NO, normally operated in the idle state of the system, will now release, thereby permitting signal 82 to energize, through: 22—93—101—59—64—82—100—23.

If the line circuit becomes short circuited, for example at Y, Y1, relays BR and NO will remain operated, relays TST and TST1 will remain unoperated but relay M, and consequently relay M1, will operate, since the current limiting resistor HR is now short circuited in the circuit for the M relay, through: 22—95—71—35—58—6—Y—Y1—5—39—33—62—94—23. The joint operation of relays M, M1 and the non-operation of relay TST1 permit signal 84 to energize, through: 22—93—99—76—41—47—84—100—23. Calling signal 50 does not energize under these conditions due to contact 40 of relay M being open.

If the tip line conductor 1 becomes grounded, as at G2, relay BR will remain operated and relay M will operate since the current limiting resistor HR is now short circuited out of the line circuit, through: G3—69—95—22—23—94—62—33—39—5—1—G2—G3. Relay NO is now shunted around the line circuit and releases, through: G3—69—71—35—58—6—2—11—51—HR—10—1—G2. The operation of relay M, the release of relay NO and relay BR remaining operated allows a circuit to be completed for the energizing of relay TST, through: 22—87—85—103—65—43—60—66—96—23. Relay TST locks in its operated position through its own contact 70, through: 22—87—85—103—65—43—104—70—66—96—23. The operation of relay TST allows relay TST1 to operate, through: 22—92—73—74—97—23. Relay TST1 also locks in its operated position through its own contact 79, through: 22—87—85—98—79—74—97—23. The operation of the TST relay also removes the short circuit around the SXR resistor by the opening of contact 69. The operation of relays TST and TST1 permits the polarity of energy source 21 to be reversed, with respect to the NO relay, which allows a path to be formed in parallel with the circuit for the M relay, allowing relay NO to operate, through:

G3—SXR—95—22—23—94—75—72—
35—58—6—2—11—51—HR—10—1—G2

The joint circuit arrangement of relay M which is maintained operated, the diversion of the current flow in the parallel path being insufficient to effect the release of relay M, and the locking of relay TST1 in its operated position allows a circuit to be formed to energize the signal 80 indicating that the tip line conductor 1 is grounded, through: 22—93—101—78—42—80—100—23. Resistor SXR limits the current flow in the parallel path.

If the line circuit becomes both short circuited and grounded as at Y1, Y1 and G4 respectively, relay RB remains operated but relay M, owing to resistor HR not being in circuit, also operates, through: G3—69—95—22—23—94—62—33—39—5—1—G4—G3. Relay NO is diverted around the circuit for the M relay and releases, through: G3—69—71—35—58—6—2—G4. The operation of relay M, the release of relay NO and relay BR remaining operated allows a circuit to be completed for the energizing of relay TST, through: 22—87—85—103—65—43—60—66—96—23. Relay TST locks in its operated position through its own contacts 70, through:

22—87—85—65—43—104—70—66—96—23.

The operation of relay TST allows relay TST1 to operate, through: 22—92—73—74—97—23. Relay TST1 also locks in its operated position through its own contact 79, through: 22—87—85—98—79—74—97—23. The operation of the TST relay removes the short circuit around the SXR resistor by the opening of its contact 69. The operation of relays TST and TST1 permits of the polarity of energy source 21 to be reversed, with respect to the NO relay, which allows a path to be formed in parallel with the circuit for the M relay allowing relay NO to operate, through: G3—SXR—95—22—23—94—75—72—35—58—6—2—G4. This parallel circuit diverts sufficient current so that the current flow in the path of the M relay is insufficient to hold that relay operated, so that relay M releases. The release of relay M allows relay TST to release by opening of contact 43 of relay M. The release of relay TST and the locking of relay TST1 in its operated position allows a circuit to be formed to energize signal 83 indicating that the line circuit is short circuited and grounded, through: 22—93—99—77—67—87—100—23. Resistor SXR limits the current flow in the parallel path.

What is claimed is:

1. A two-way communication system which includes a central station and a district station connected together by a pair of line conductors to form a closed line circuit consisting in combination therewith: a unidirectional current source arranged to energize the line circuit so that a current of a predetermined magnitude normally flows therein in a predetermined direction, a first relay disposed at the central station responsive to the line current above a predetermined value, a second relay responsive to the operation of the first relay, circuit connecting means for locking and releasing the second relay in and out of its operated position, means responsive to the release and to the operation of the first and second relays respectively arranged to produce a signal indication; current control means disposed at the district station arranged to control the magnitude of the current flowing in the line circuit, a third relay disposed at the district station responsive to the line current in a predetermined direction, means responsive to the operation of the third relay arranged to produce a signal indication; means in association with the current source arranged to reverse the direction of the flow of the current in the line circuit whereby the third relay is operated.

2. A two-way communication system in accordance with claim 1 in which said current control means consists of a current limiting resistor normally included in the line circuit and manually operated means thereat for excluding the current limiting resistor from the line circuit.

3. A two-way communication system which includes a central station and a district station connected together by a pair of line conductors to form a closed circuit consisting in combination therewith: a first relay responsive to a current above a predetermined value, a second relay responsive to the operation of the first relay, circuit connecting means for locking and releasing the second relay in and out of its operated position, a third and a fourth relay, a unidirectional current source interposed between the third and fourth relays, the first, third and fourth relays being connected in series relation and bridged across the line circuit at the central station, the current source being arranged so that a current of a predetermined magnitude normally flows in the line circuit in a predetermined direction, potential grounding means, circuit connecting means associated therewith and with the current source arranged to exclude the fourth relay from the closed line circuit upon the grounding of the line conductor to which the fourth relay is connected; means responsive to the joint release and operation of the first and second relays respectively; to the joint operation and release of the third and fourth relays respectively; to the joint release of the third and fourth relays; to the joint operation of the first and second relays; to produce individual signal indications; current control means disposed at the district station arranged to control the magnitude of the current flowing in the line circuit, a fifth relay included in the line circuit at the district station responsive to the line current in a predetermined direction, means responsive to the operation of the fifth relay to produce an indicating signal thereat; means at the central station in association with the current source to reverse the flow of the current in the line circuit.

4. A two-way communication system which includes a central station and a district station connected together by a pair of line conductors to form a closed circuit consisting in combination therewith: a first relay responsive to a current above a predetermined value, a second relay responsive to the operation of the first relay, circuit connecting means for locking and releasing the second relay in and out of its operated position, a third and a fourth relay, a unidirectional current source interposed between the third and fourth relays, the first, third and fourth relays being connected in series relation and bridged across the line circuit at the central station, the current source being arranged so that a current of a predetermined magnitude normally flows in the line circuit in a predetermined direction, potential grounding means, circuit means associated therewith and with the current source arranged to exclude the fourth relay from the line circuit upon the grounding of the line conductor to which the fourth relay is connected; means responsive to the release and operation of the first and second relays respectively arranged to produce a signal indication; means responsive to the release of the fourth relay and the operation of the third relay to produce an indicating signal; current control means disposed at the district station arranged to control the magnitude of the current flowing in the line circuit, a fifth relay included in the line circuit at the district station responsive to the line current in a predetermined direction; means responsive to the operation of the fifth relay to produce an indicating signal at the district station, means at the central station in association with the current source to reverse the flow of the current in the line circuit whereby the fifth relay is operated.

5. A two-way communication system which includes a central station and a district station connected together by a pair of line conductors to form a closed circuit consisting in combination therewith: a first relay responsive to a current above a predetermined value, a second relay responsive to the operation of the first relay, circuit connecting means for locking and releasing the second relay in and out of its operated position, third and fourth relays, a unidirectional current source interposed between the third and fourth relays, the first, third and fourth relays being connected in series relation and bridged across the line circuit at the central station, the current source being arranged so that a current of a predetermined magnitude normally flows in the line circuit in a predetermined direction, potential grounding means, circuit connecting means associated therewith and with the current source arranged to exclude the fourth relay from the closed line circuit upon the grounding of the line conductor to which the fourth relay is connected, a fifth relay, responsive to the operation of the first and third relays and the release of the fourth relay, circuit connecting means for locking the fifth relay in its operated position, a sixth relay responsive to the operation of the fifth relay arranged to reverse the polarity of the energy source with respect to the fourth relay, circuit connecting means for locking the sixth relay in its operated position, means responsive to the joint release and operation of the first and second relays respectively, to the joint operation of the third relay and the release of the fourth and fifth relays, to the joint release of the third and fourth relays, to the joint operation of the first and second relays and the release of the sixth relay, to the operation of the first and sixth relays, to the release and operation of the fifth and sixth relays respectively, for producing six individual indicating signals; current control means disposed at the district station arranged to control the magnitude of the current flowing in the line circuit; a seventh relay included in the line circuit at the district station responsive to the line current in a predetermined direction; means responsive to the operation of the seventh relay to produce an indicating signal at the district station; means at the central station in association with the current source to reverse the flow of the current in the line circuit whereby the seventh relay is operated.

References Cited in the file of this patent

UNITED STATES PATENTS 2,052,057 Reid ------------------ Aug. 25, 1936